INVENTORS
Günther Scharowsky &
Jürgen Von Issendorf

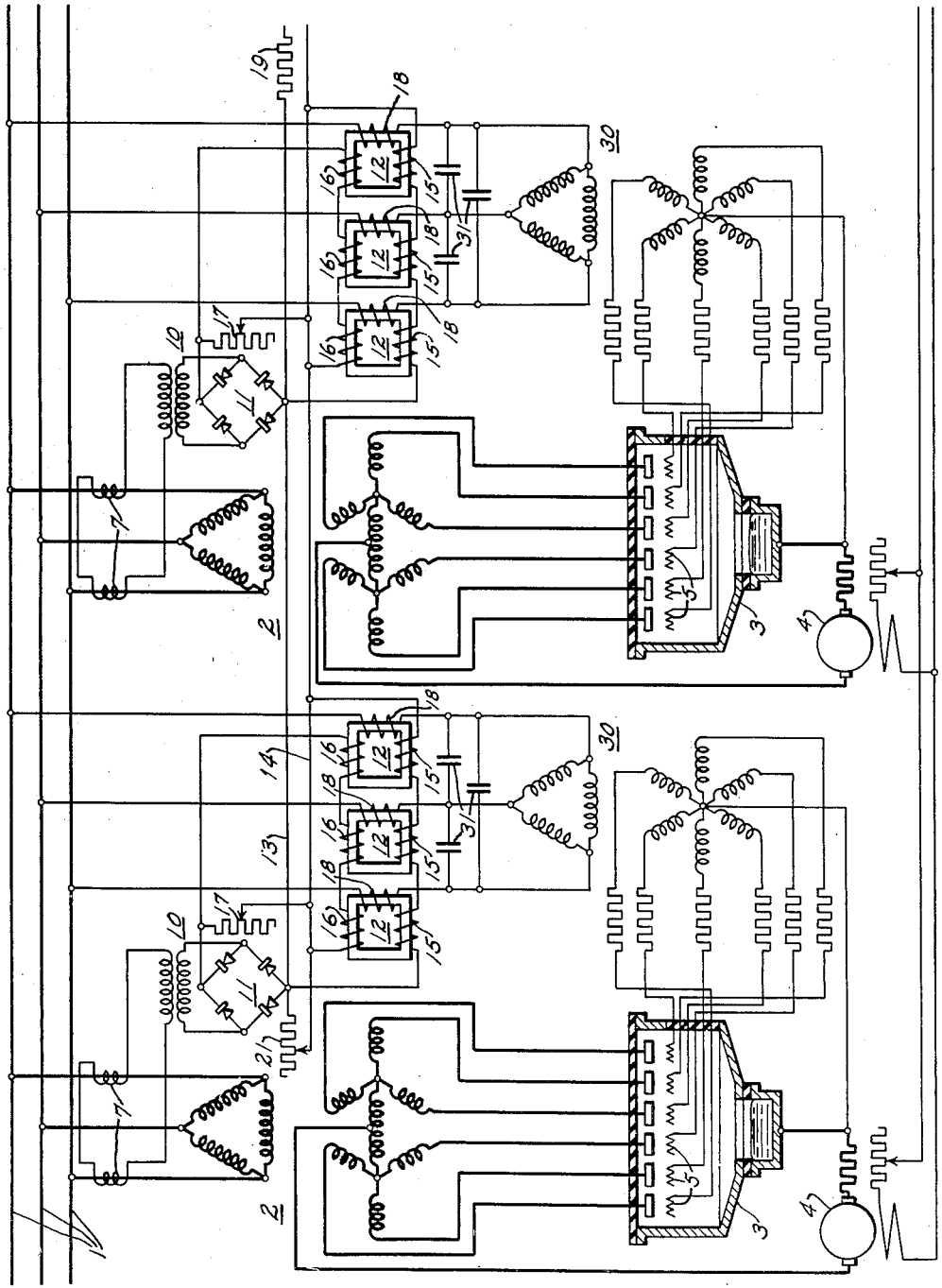

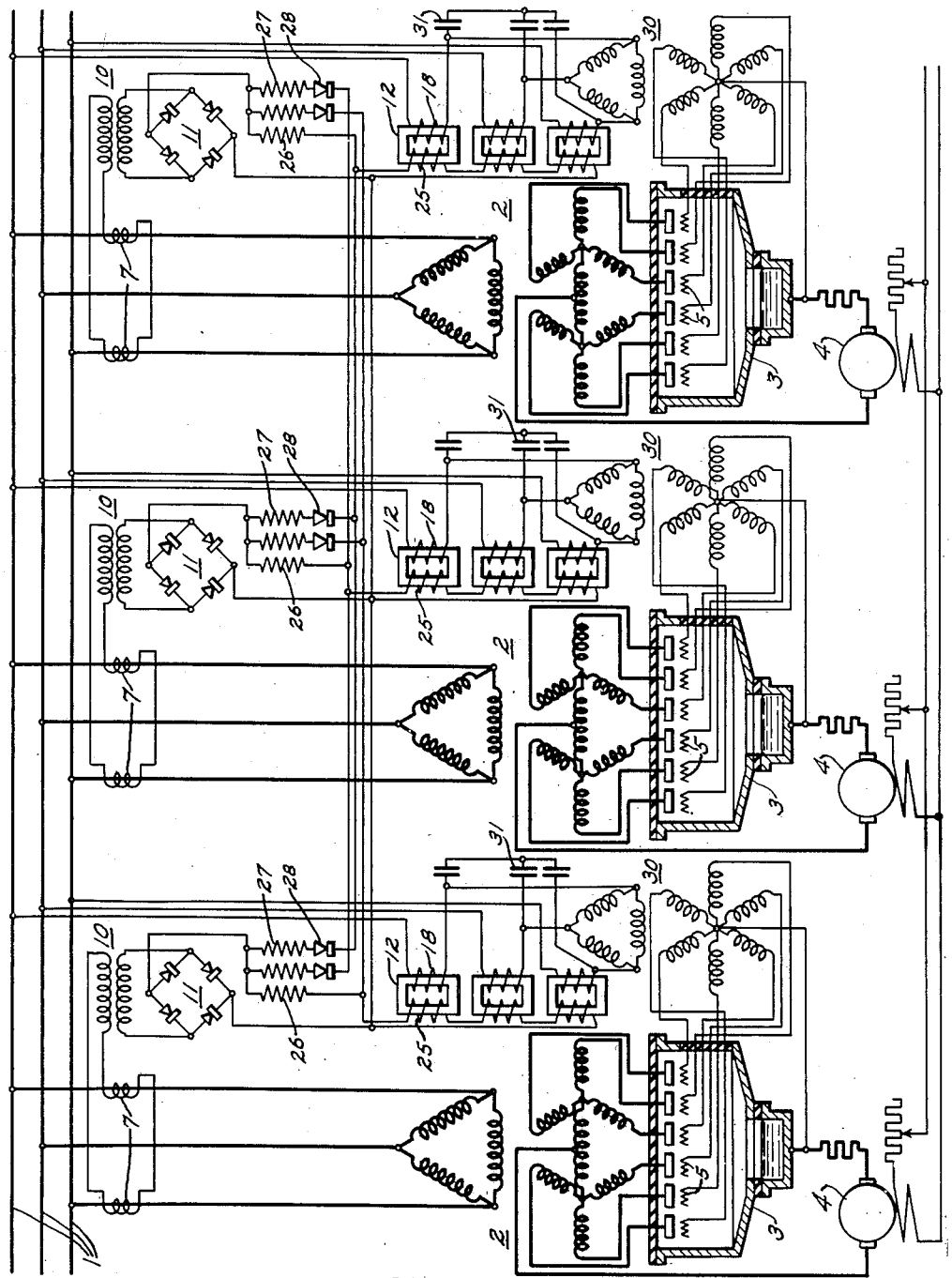

Patented Mar. 18, 1941

2,235,388

UNITED STATES PATENT OFFICE 2,235,388

VAPOR ELECTRIC DEVICE

Günther Scharowsky, Berlin-Charlottenburg, and Jürgen von Issendorff, Berlin-Siemensstadt, Germany, assignors to Westinghouse Electric & Manufacturing Company, East Pittsburgh, Pa., a corporation of Pennsylvania Application April 1, 1939, Serial No. 265,558
In Germany April 1, 1938

5 Claims. (Cl. 171—97)

Our invention relates to vapor electric devices and particularly to control systems for securing group compounding for grid controlled rectifiers.

In the rectifier art, cases, at times, arise in which similar direct current loads are each supplied from a rectifier, for example, a mercury vapor rectifier with arc ignition by grid control and the condition is to be fulfilled that the delivered direct current potentials must have a definite relationship to each other. This is particularly the case in the so-called forward rotation arrangements where individual direct current motors engage at different points, for example, elevators in which the part to be lifted cannot suffer an angular displacement. Similar requirements are also imposed in the rolling processes, paper machines and particularly in roller trains where different rollers are to be driven independently of each other, but their individual speed is determined by the material rolled because neither a pulling nor a compressing of the rolled material, simultaneously passing under a plurality of rollers, is permissible.

The proposal has already been made to compound the grid control rectifiers which feed the motors, i. e., to control them independent of the current thereby to render the rotational speed independent of the load. The proposal has also been made to carry out the compounding in dependence upon the loading of the neighboring rolls. These measures have, however, not been sufficient to produce the required uniformity of the motor rotational speeds, because additional potential drops by reason of the network reaction were impressed on all of the rectifiers.

Fig. 2 is a similar view showing a modification according to the invention.

Fig. 3 is a further modification according to the invention.

Figure 1:
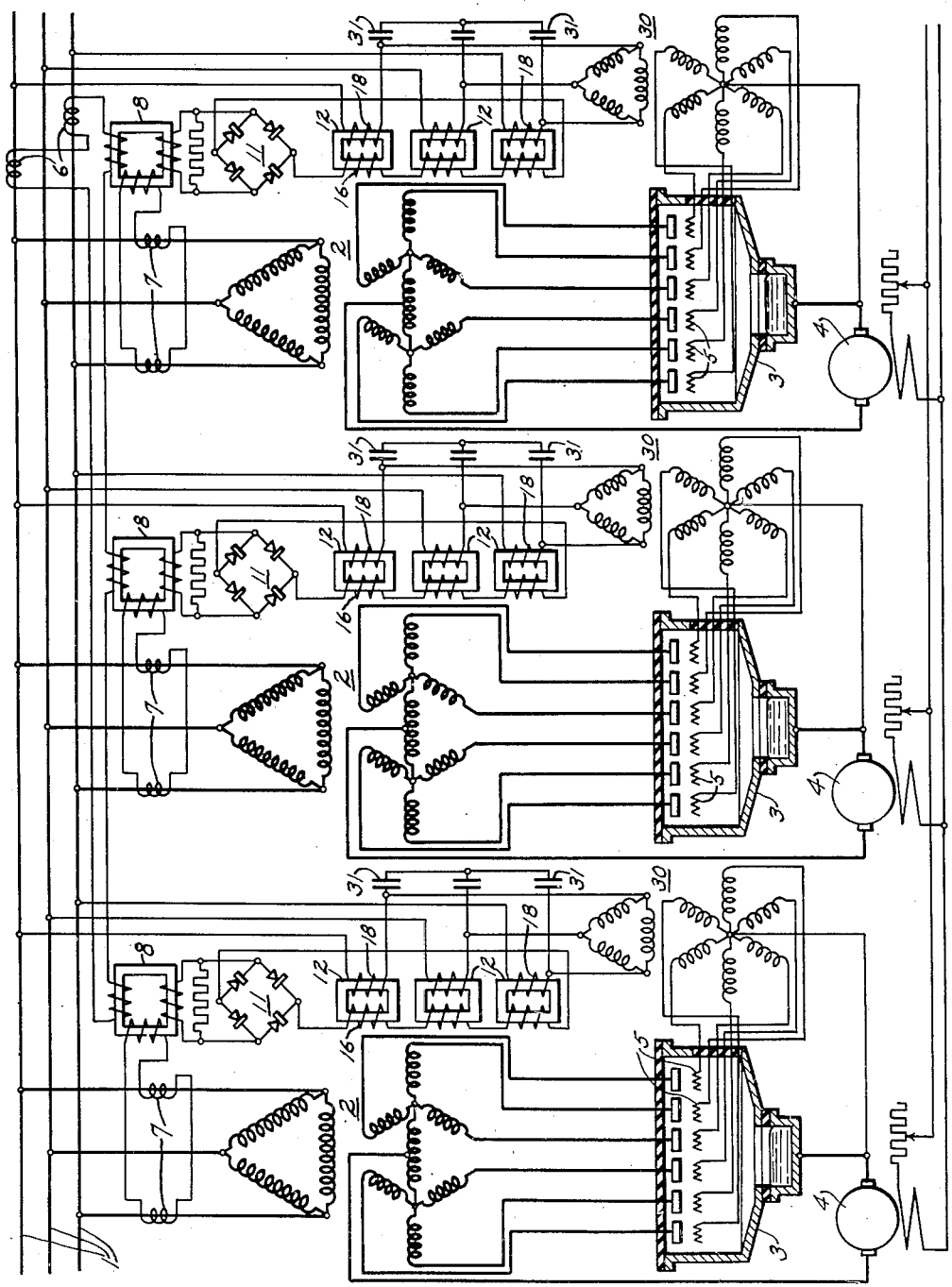
Figure 1 is a schematic illustration of a converter system having one form of compounding according to the invention.

In the illustrative embodiment according to Figure 1, an alternating current supply system 1 of any desired phase number is connected to rectifier transformer devices 2 which feed the grid controlled vapor electric converters 3.

In accordance with our invention, the compounding is made dependent not only on the individual loading currents, but on the sum of the loading currents of a plurality of rectifiers together. In particular cases, it may be preferable to form the sum of all of the associated rectifiers, in other cases, it will be sufficient to form the sum for all of those rectifiers of which the rectifier transformers are in agreement with each other. The sum formation may be carried out in many different ways as shown by the exemplary embodiments illustrated in the drawings.

A direct current motor 4 is connected in the direct current circuit of each of the individual rectifiers 3 of the group. The grids 5 of the rectifiers 3 have control potentials impressed thereon by means of associated control apparatus herein illustrated as control transformers 30. In order to shift the phase of the control transformers 30, chokes 12 are inserted in series with each of the alternating current leads to the primary of the transformer 30 and connected across these leads are suitable capacitances 31. In order to effect the necessary control of the chokes 12, a winding 16 is placed on one leg of the choke while a series winding 18 is associated with the alternating current leads of the control devices 30. To secure the control potentials, a current transformer 6 is placed in the alternating current supply circuit in such a position that it measures the total current delivered to the entire group of converters. Also, in the individual leads to the separate converters is a current transformer 7. The output circuits of the current transformers 6 and 7 are associated with an auxiliary transformer 8, the output current of which is rectified by means of the rectifying device 11. This rectified potential is impressed on the control windings 16.

It will, therefore, be seen that if the total rectifier current or the individual rectifier current varies, there will be a variation of the current through the control windings 16 so that any current variation will be compensated so that each of the individual motors 4 of the system may be adjusted to any desired speed and this speed proportion maintained by means of the compounding connections from the current transformers 6 and 7. The number of current transformers 6 and 7 used in any particular place is governed by the phase number of the alternating current circuit 1. In general, a single transformer at each position will be sufficient for a single-phase circuit but in polyphase circuits two transformers will, in general, be sufficient.

Figure 2A:
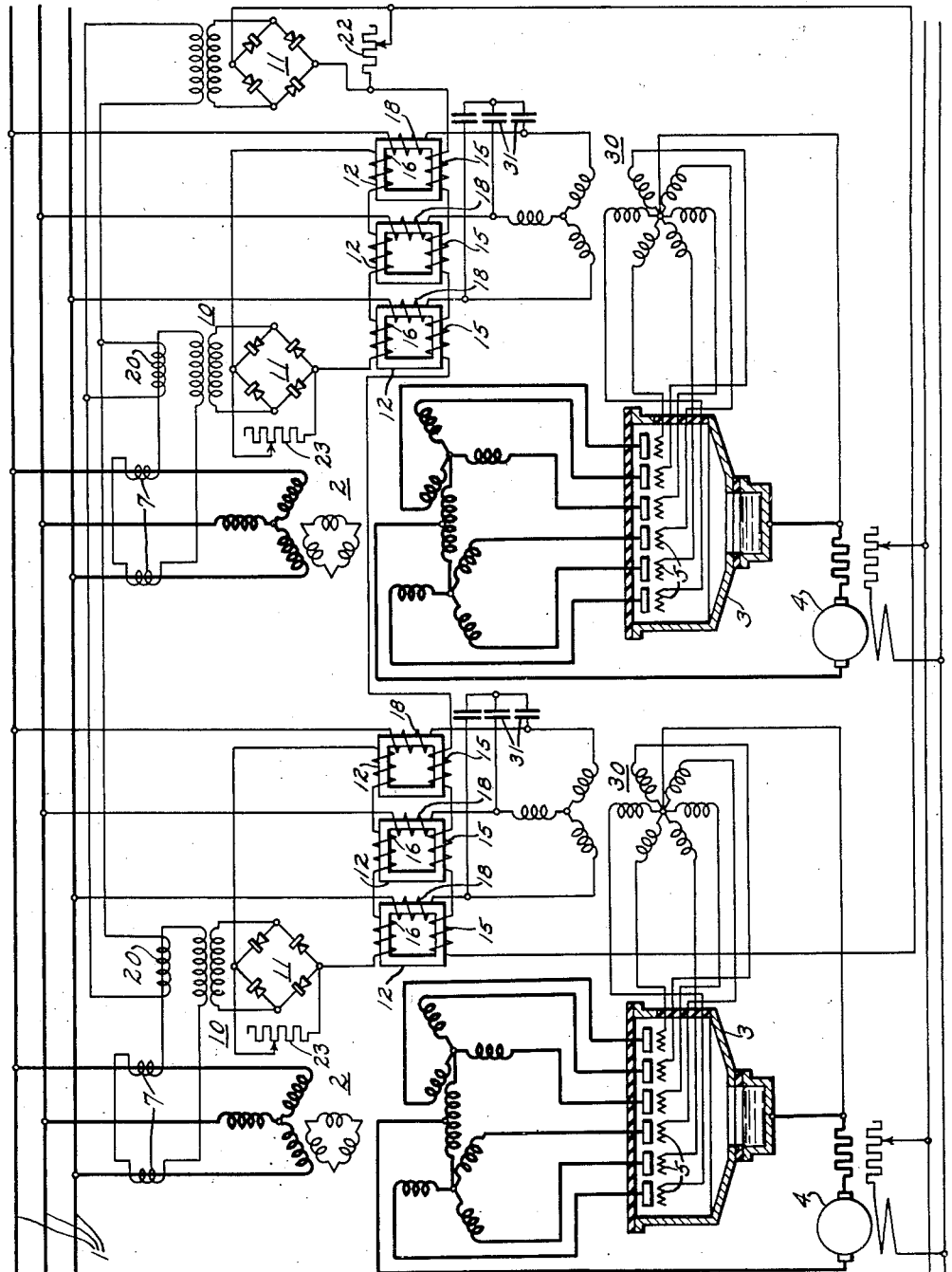
Fig. 2A is a further modification according to the invention.

In Fig. 2, a plurality of separate rectifier circuits are also connected to a common network. It is here assumed that the primaries of the transformers are connected one half in delta and the other half in star. In this case, it is preferable to form the sum of the currents of the rectifiers similarly connected for themselves. Two examples of this are shown in Figs. 2 and 2A. The current transformers 7, which, for example, may be arranged in V connection in case a polyphase network is involved, are connected to transformers 10, the secondary windings of which operate through dry rectifiers 11 on the windings 16 of iron chokes 12. In the direct current circuit of the current transformer circuits which are associated with the transformers 2 with primary in delta connection, a series circuit is provided in that the direct currents of two current transformer circuits are conducted through the common bus bars 13 and 14. To 13 and 14, the windings 15 of the chokes 12 are connected and in addition, a regulating impedance 21 with the aid of which the current in the windings 15 may be adjusted to a definite fraction. After the flow of current through the windings 15, the currents flow now individually to the windings 16 in parallel with which further adjusting impedances 17 are connected. By this arrangement, the situation is attained that the windings 16 have impressed thereon currents proportional to the individual loading currents of the current transformers 7, the winding 15, on the other hand, currents proportional to the sum currents of the transformer 7. By the direct current biasing of the chokes 12, the inductance of the winding 18 may be varied to any desired extent and thereby, a regulation in the control circuits may take place. By coupling the conductors 13 and 14 with corresponding conductors of other rectifier groups through the impedance 19, a conditioned influencing of a plurality of groups on each other may be effected.

In the modification according to Fig. 2A an additional controlling potential may be secured by a summation of the alternating currents of the current transformers 7 with the aid of additional current transformers 20. The currents of the transformers 20 are rectified by an additional full wave rectifier 11. The direct-current currents derived in this manner may be supplied in corresponding manner to the windings 15 and 16 of the chokes 12 and also may be adjusted through the parallel impedances 22 or 23.

An example for the sum formation with only small additional means is shown in Fig. 3. Here the reference characters corresponding to those in Fig. 2 apply. The iron chokes 12 each has only one direct current winding 25 which has impressed thereon, through the impedance 26, the direct current of the current transformer circuit. The sum formation may be effected by the coupling circuits with each through the impedances 27. To prevent subtraction, the valves 28 are connected in series with the impedance 27.

The method of combined individual and sum compounding brings the advantage that the rotational speed of the motors 4 is made independent of the loading in an individual, as well as in an external circuit, and the desired value may be maintained extraordinarily accurate. By simple impedance and adjustment, a good constant operation of all individual parts is secured and in particular, the situation is avoided that for suddenly manifested loading of individual rectifier loads, the others are drawn into sympathetic operation, particularly, in the cases in which a considerable network inductance is connected in series with all the rectifiers together. The devices, according to the invention, may also be provided in already existing plants with individual compounding without substantial auxiliary means. For finishing work in the course of operation where a plurality of operating processes simultaneously are carried out on single material, as for example, roller trains, there results the particular advantage that the beginning, middle and end of the material are worked with substantially uniform speed and consequently a uniform quality of material, that is, the greatest utility, is secured.

We claim as our invention:

1. A control system for regulating a plurality of vapor electric devices supplying similar loads comprising control electrodes in each of said devices, an impulsing transformer associated with each of said devices for supplying control potential to the grid of said device, means for providing a control potential proportional to the total load on all of said devices, means for providing control potentials proportional to the loads in the individual devices and means for shifting the phase of the individual impulsing transformers in accordance with the sum of the potentials.

2. A control system for compound regulation of a plurality of converters supplied from a common source and supplying similar loads comprising control electrodes for each of said converters, individual impulsing devices for each of said converters, impedance means for shifting the phase of said impulsing devices, a current transformer responsive to the total load on said converters, current transformers responsive to the individual converter loads, means for impressing the potential of said first mentioned current transformer on each of said impedance means and means for impressing the potential of the individually responsive current transformers on the associated impedance means.

3. A control system for compound regulation of a plurality of converters supplied from a common source and supplying similar loads comprising control electrodes for each of said converters, individual impulsing devices for each of said converters, impedance means for shifting the phase of said impulsing devices, a current transformer responsive to the total load on said converters, current transformers responsive to the individual converter loads, an auxiliary transformer for each of said converters, each of said auxiliary transformers having two primary windings, one of said primary windings being energized by the potential of the current transformer responsive to the total load on said converters, the other of said primary windings being energized by the potential of the current transformer responsive to the individual converter load, and means for impressing the output potential of the auxiliary transformer on the associated impedance means.

4. A control system for compound regulation of a plurality of converters supplied from a common source and supplying similar loads comprising control electrodes for each of said converters, individual impulsing devices for each of said converters, impedance means for shifting the phase of said impulsing devices, a current transformer responsive to the total load on said converters, current transformers responsive to the individual converter loads, an auxiliary transformer for each of said converters, each of said auxiliary transformers having two primary windings, one of said primary windings being energized by the potential of the current transformer responsive to the total load on said converters, the other of said primary windings being energized by the potential of the current transformer responsive to the individual converter load, means for rectifying the output potential of the auxiliary transformer and means for impressing the rectified potential of the auxiliary transformer on the associated impedance means.

5. A control system for compound regulation of a plurality of converters supplied from a common source and supplying similar loads comprising control electrodes for each of said converters, individual impulsing devices for each of said converters, direct current premagnetized chokes for shifting the phase of said impulsing devices, a current transformer responsive to the total load on said converters, current transformers responsive to the individual converter loads, an auxiliary transformer for each of said converters, each of said auxiliary transformers having two primary windings, one of said primary windings being energized by the potential of the current transformer responsive to the total load on said converters, the other of said primary windings being energized by the potential of the current transformer responsive to the individual converter load, means for rectifying the output potential of the auxiliary transformer and means for impressing the rectified potential of the auxiliary transformer on the associated direct current premagnetized chokes.

GÜNTHER SCHAROWSKY.
JÜRGEN V. ISSENDORFF.